UNITED STATES PATENT OFFICE.

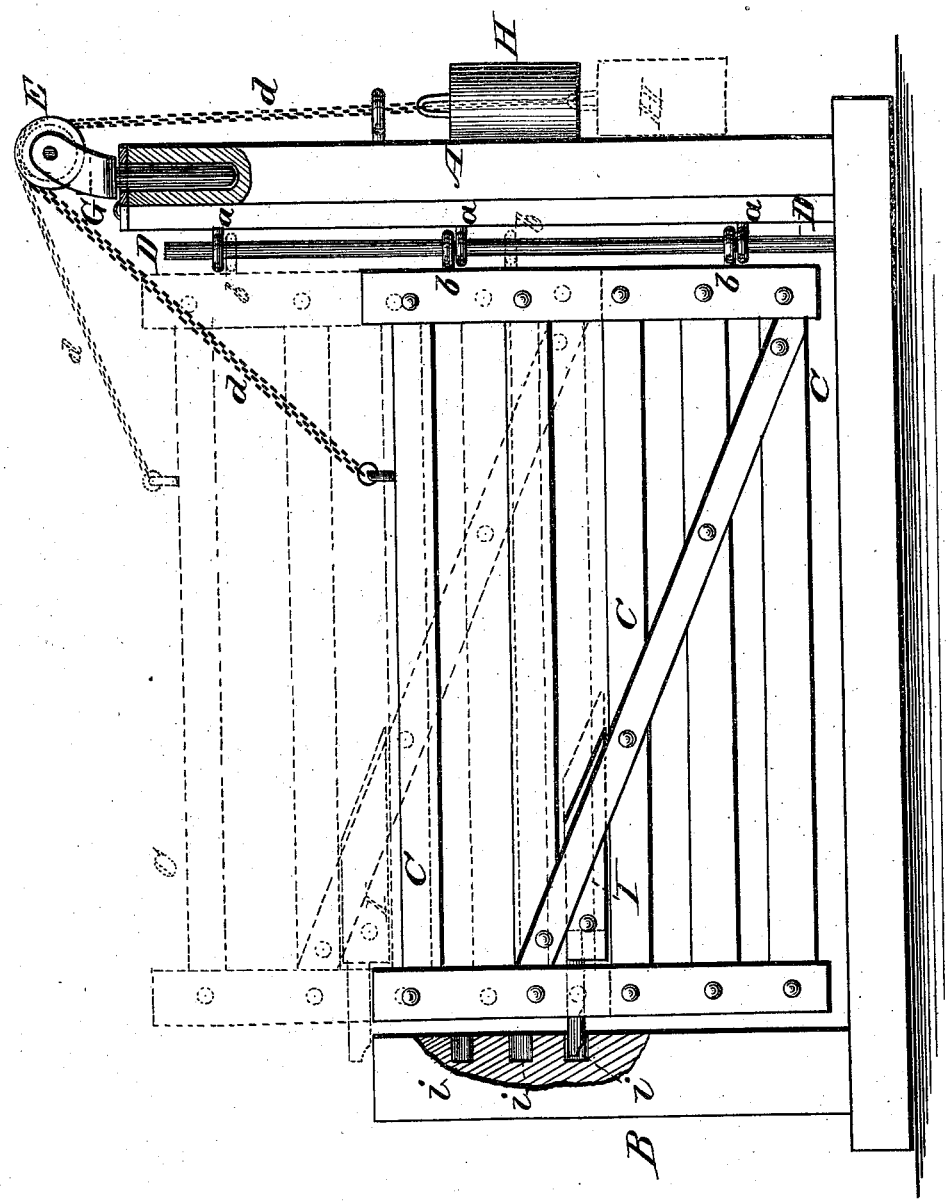

DANIEL H. KIME, OF KENDALLVILLE, INDIANA.

IMPROVEMENT IN GATES.

Specification forming part of Letters Patent No. 174,259, dated February 29, 1876; application filed January 26, 1876.

*To all whom it may concern:*

Be it known that I, DANIEL H. KIME, of Kendallville, in the county of Noble and State of Indiana, have invented certain new and useful Improvements in Gates; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in a gate attached by eyebolts to a vertical rod and suspended and balanced by means of a weight connected to the gate by a chain passing over a swiveled pulley on top of the gate-post, as will be hereinafter more fully set forth.

In the annexed drawings the figure is a side elevation of my invention. A and B represent the two gate-posts between which the gate C is placed. In the inner side of the post A are fastened three eyebolts, $a\ a$, through which is passed a vertical rod, D, said rod also passing through eyebolts $b\ b$, fastened in the end of the gate C. When the gate is in its ordinary position the eyebolts $b$, in the gate rest upon the two lower eye bolts $a$, in the post, as shown, and the gate may turn in either direction on the rod D. To the top of the gate C, a suitable distance from the inner end is attached a chain, $d$, which passes up over a pulley, E, mounted in a frame, G, and said frame swiveled in the top of the post A. To the other end of the chain $d$ is attached a weight, H, which should be of sufficient proportions to balance the gate. The gate may thus be raised to any height desired on the rod D, and held suspended and balanced by the weight H, whereby it may be arranged to avoid snow in winter-time, and to allow small stock to pass under the gate while large stock is prevented from going through. The gate is latched by means of a sliding bolt, I, in the gate entering any one of a series of holes, $i$, in the inner side of the post B, according to the altitude at which the gate is held.

Having thus fully described my invention, what I claim as new, and desire to secure by Letters Patent, is—

A swinging gate, C, vertically adjustable on the rod D, in combination with chain or cord $d$, weight H, and swiveled pulley E, substantially as and for the purpose specified.

In testimony that I claim the foregoing as my own, I affix my signature in presence of two witnesses.

DANIEL H. KIME.

Witnesses:
J. R. BAKER,
W. H. COX.